(12) United States Patent
Heine

(10) Patent No.: US 7,052,137 B2
(45) Date of Patent: May 30, 2006

(54) SPECTRAL LIGHT DIVISION AND RECOMBINING WITH INCIDENT FACE FOR LIGHT TO BE DIVIDED

(75) Inventor: Claus Heine, Chur (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 9 days.

(21) Appl. No.: 10/756,654

(22) Filed: Jan. 13, 2004

(65) Prior Publication Data

US 2004/0145706 A1    Jul. 29, 2004

Related U.S. Application Data

(60) Continuation of application No. 10/059,888, filed on Jan. 29, 2002, which is a division of application No. 09/291,752, filed on Apr. 14, 1999, now Pat. No. 6,550,919.

(30) Foreign Application Priority Data

Mar. 26, 1999  (CH) .................................... 586/99

(51) Int. Cl.
  *G03B 21/14*  (2006.01)
(52) U.S. Cl. .................... 353/20; 353/31; 353/33; 349/5; 359/634
(58) Field of Classification Search .................. 353/20, 353/31, 33, 34, 37; 349/5, 7, 8, 9; 359/630, 359/634

See application file for complete search history.

(56) References Cited

U.S. PATENT DOCUMENTS

| 5,298,986 A  * | 3/1994 | Owada et al. ............. 348/762 |
| 6,247,814 B1 * | 6/2001 | Lin ............................. 353/20 |
| 6,375,330 B1 * | 4/2002 | Mihalakis .................... 353/31 |
| 6,550,919 B1 * | 4/2003 | Heine .......................... 353/31 |

* cited by examiner

Primary Examiner—William C. Dowling
(74) Attorney, Agent, or Firm—Notaro & Michalos, PC

(57) ABSTRACT

A spectral light division and recombination configuration and method has an incident face for light to be divided and at least one emergent face for recombined light. A spectrally selective light division system selectively separates light of a first spectral range from light of a second and of a third spectral range left combined. A recombining system recombining light of the first spectral range with light of the second and third spectral ranges are also included and the first spectral range is green light and is spectrally located between the second and the third spectral ranges.

34 Claims, 7 Drawing Sheets

SPECTRAL LIGHT DIVISION AND RECOMBINING WITH INCIDENT FACE FOR LIGHT TO BE DIVIDED

CROSS REFERENCE TO RELATED APPLICATIONS

This is a continuation of U.S. patent application Ser. No. 10/059,888 filed Jan. 29, 2002, which was a divisional of U.S. patent application Ser. No. 09/291,752, filed Apr. 14, 1999 and now U.S. Pat. No. 6,550,919, which claimed priority on Swiss patent application number 586/99 filed Mar. 26, 1999, which priority is claimed for the present application as well.

FIELD AND BACKGROUND OF THE INVENTION

The present invention relates to a spectral light division and recombination configuration as well as a process for the spectrally selective modulation of light.

Definitions:
Light,
visible light: light with maximum energy in the spectral range 380 nm–720 nm
red light: light with maximum energy in the spectral range 580 nm–780 nm, in particular in the spectral range 600 nm–680 nm
green light: light with maximum energy in the spectral range 490 nm–605 nm, in particular in the spectral range 500 nm–600 nm
blue light: light with maximum energy in the spectral range 380 nm–510 nm, in particular in the spectral range 420 nm–500 nm
yellow light: light with maximum energy in the spectral range 475 nm–605 nm, in particular at 482 nm+3 nm
white light: light with red, blue and green light components
linearly polarized light: light whose electric field vector oscillates in a plane.
reflective light
valve: image producing element which operates in reflection, for example on the basis of liquid crystals with polarization rotation (rLCD).
bright state rLCD: With reflection of light on pixels of the reflective light valve, the polarization is rotated by an odd-numbered multiple of 90°.
dark state rLCD: With reflection of light on pixels of the reflective light valve the polarization is maintained.
F number: Variable describing the angle opening-out of an illumination optics system. It is given by the reciprocal value of the twofold numerical aperture NA, wherein NA=n sin α, and n is the refractive index of the medium, α one half of the aperture angle of the illumination cone. Therefore, the smaller the F number, the wider the aperture angle. Typical F numbers are in the range from 5 to 2.5; F numbers of 2 down to 1.4 are also used.

Optical light division and recombination configurations are used primarily in projectors in order to divide white light into red, green and blue light or to recombine the latter in order to form white light.

It is known to divide, by means of such a configuration in projection apparatus, white light into light of said three spectral ranges, to modulate each via light valves operating in transmission, such as in particular LCD light valves, to be image producing and subsequently to recombine the modulated light of the three spectra to form an imaging beam. The light valves, as the image-producing structural elements, comprise a multiplicity of individually drivable pixels. Their number yields therein the resolution according to the formats EVGA, SVGA, EGA, XGA, etc. When using light valves operating in transmission a lower limitation of the pixel size exists which can only be overcome with difficulty due to the printed conductor tracks and the drive electronics. In addition, with a decrease of the pixel size, the optical aperture per pixel decreases.

The present invention, in contrast, relates to a process for the spectrally selective modulation of light by means of light valves operating in reflection. The optical light division and recombination configuration, to which the invention relates further, consequently is preferably used in combination with light valves operating in reflection for the formation of a configuration according to the invention for the optical light division, spectrally selective modulation and subsequent recombination.

When using light valves operating in reflection the restrictions regarding light valves operating in transmission cease to apply. Controlled light valves operating in reflection do not rotate in the dark state of a pixel the polarization of the light reflected thereon with respect to that of the incident light, while in the bright state the polarization of the reflected light is rotated by 90° with respect to the polarization of the incident light.

In a process of the above described type, or an optical light division and recombination configuration of the above type, it is necessary, on the one hand, to ensure that white light is divided into light of said three spectra, and light of said three spectra, after reflective modulation and modulation-dependent or drive-dependent polarization rotation, is combined to white light, therewith, on the other hand, light from pixels operated in the bright state should be recombined to form a first light beam—the imaging beam—, light of pixels operated in the dark state not emerging on said beam, therewith in particular, should be recombined to form a second light beam—the dark reflection beam, wherein both said beams should leave the light division and recombination configuration in different directions. The first is preferably, and in view of the use on a projection arrangement, guided to its imaging optics system; the latter should, for example or preferably, be guided back to the white light source.

Previously known solutions for processes, and for optical light division and recombination configurations of the above type, can be divided into formulations using glass plates and formulations with solid glass bodies. In both cases, again, geometries can be differentiated which operate on the basis of angular beam deflections of 45° or 90°, and those operating on the basis of angles which differ from beam deflections of 45° or 90°.

Configurations realized with angles of 45° are described, for example, in DE 40 33 842, which describes a rectangular parallelepiped structural element composed of discrete prisms with dichroic layers. Such a structural element is customarily referred to as an X-cube. With respect to such X-cubes and their uses, further reference is made to U.S. Pat. No. 2,737,076, U.S. Pat. No. 2,754,718, JP 7-109443, U.S. Pat. No. 5,098,183, EP A 0 359 461, as well as WO98/20383 by the same applicant as the present application.

Angles deviating from 45° as well as solid glass bodies are used, for example, according to U.S. Pat. No. 3,203,039 which lead to configurations generally known as "Philips prisms".

Furthermore are known diverse combinations of dichroic splitter configuration plates—spectrally selective splitters—combined with prism configurations, thus, for example, from U.S. Pat. No. 3,945,034, or combined with X-cubes.

For a realization form known under the designation 3PBS system, reference can be made to R. L. Melcher "High Information—Content Protection Display Based on Reflective LC on Silicon Light Valves", SID 98 Digest, pp. 25–28, 1998.

As has been mentioned, in spectral light division and recombination light of different polarization states must be handled after the reflective modulation.

An X-cube configuration, if appropriate in combination with a polarization-selective beam-splitting configuration, such as is described for example in said WO98/20383, presupposes dichroic layer systems, which have minimum polarization effects since they are acted upon by light of different polarization, which should only be handled with spectral selectivity.

In this respect reference is made to A. Thelen "Nonpolarising interference films inside a glass cube", Appl. Optics Vol. 15, No. 12, December 1976.

Regarding problems concerning the dark-state transmission characteristics of light division and recombination techniques operating with reflective light valves, reference is made to A. E. Rosenbluth et al.: "Contrast properties of reflective liquid crystal light valves in projection displays", IBM Journal of Research and Development, Vol. 42, No. 3/4 May/July, pp. 359–383,1998. A solution of these problems is only possible with considerable design and fabrication expenditures.

Realizations according to the above listed Philips prisms or similar approaches are based, as a rule, on total internal reflection at one or several air gaps. Apart from the difficulties in the production of such air gaps, the total reflection is the limiting factor for the F numbers possible in practice. In addition, such systems are very sensitive with respect to residual reflections which, for example, can occur if the transitions from one optical refractive index to the other are not optimally matched and which as ghosts can 'haunt' the system under diverse directions.

In the case of approaches toward a solution using solid glass bodies, the problem of the mechanical birefringence in the glass or the substrate material must be taken into consideration whereby the polarization of the light is rotated uncontrollably with stochastic distribution. A contrast loss is generated in the process which is not constant over the illuminated surface.

Structural parts in which dichroic plates in the imaging ray path are used, are, on the other hand, afflicted with the problem that an astigmatism is generated through the plates. The high requirements made of the planity of such substrates places limits on the transition to thinner substrates in which this astigmatism would become negligibly small.

SUMMARY OF THE INVENTION

The present invention is based on the task of proposing a configuration as well as a process of the above described type, by means of which it becomes possible to combine in a driven state (bright state) of the light valves the recombined light with maximum intensity in a first beam while it emerges on this beam with minimum intensity if it originates from the light valves in the other driven state (dark state).

Further, a high angle acceptance is to be realized, i.e. low F numbers are to be possible.

This task is solved through the configuration and the processes of the above stated type, which are distinguished according to the claims.

By using polarization-selective beam division and recombination it becomes possible to divide the recombined light as a function of the driven or modulation state of the light valves, i.e. to form an imaging beam from light of valves which are operated in the one modulation state, the bright state. When used in a projection apparatus, on the one hand, an imaging beam of light with high intensity is obtained, which is reflected on the valves or their pixels in the bright state, and, on the other hand, preferably a further beam of light reflected on the pixels in the dark state. The latter is preferably directed to the illumination source.

Preferred embodiments of the configuration as well as of said process are specified in the corresponding dependent claims.

The present invention relates furthermore to a projection arrangement with said optical light division and recombination configuration according to still further claims.

BRIEF DESCRIPTION OF THE DRAWINGS

In the following, the invention will be explained by example with reference to figures, which depict.

DESCRIPTION OF THE PREFERRED EMBODIMENTS

Figure 1:
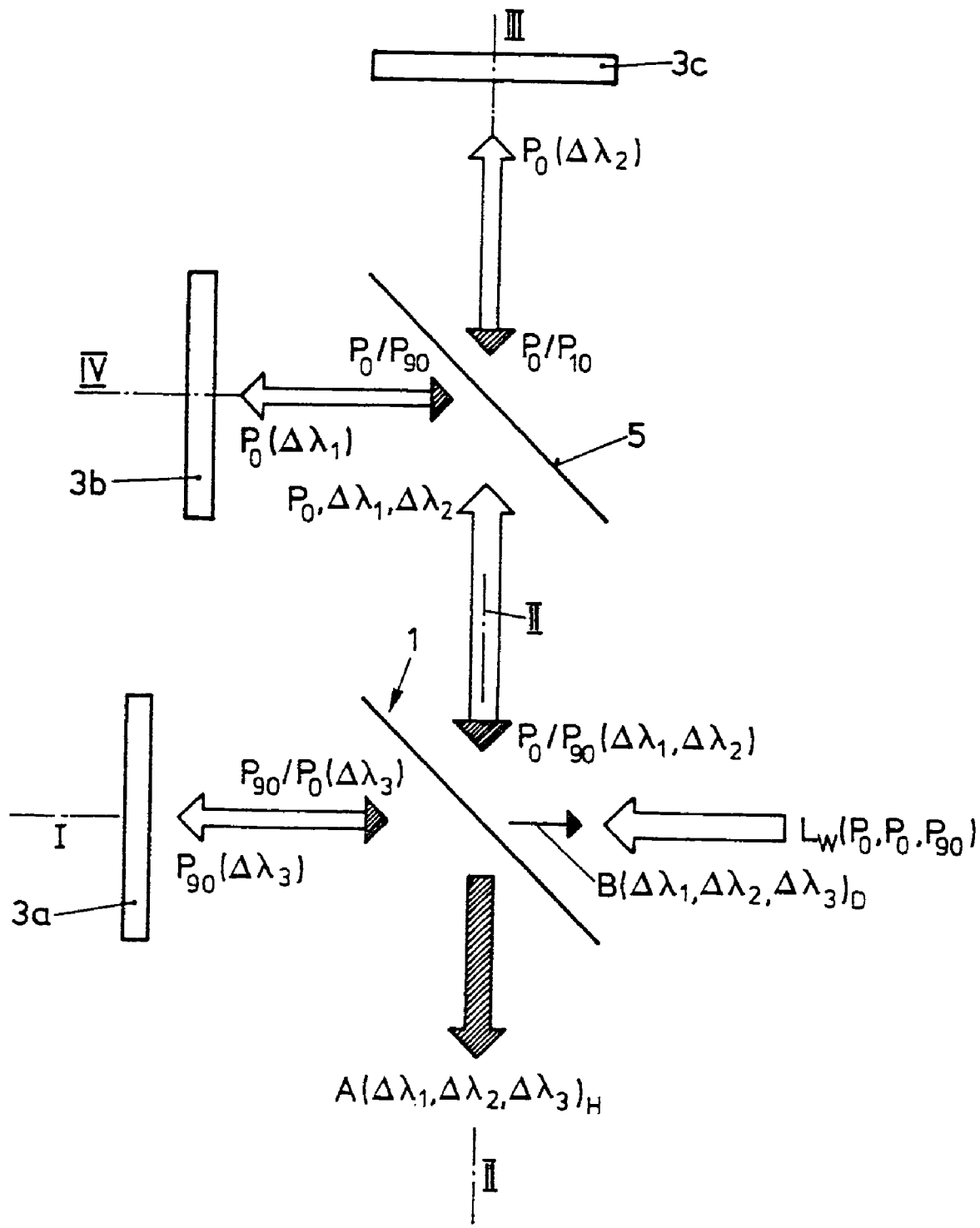
FIG. 1 schematically a configuration according to the invention toward an explanation of the process according to the invention, FIG. 2 schematically a first embodiment of the configuration according to the invention operating after the inventive process, FIG. 3 in detail a configuration according to the invention which operates after the process according to the invention, in preferred embodiment, FIG. 4 by example the transmission behavior of a spectrally selective layer system for s-polarized and p-polarized light, used for example in the approach according to the invention, FIG. 5 the transmission behavior of a polarization-selective layer system, such as used, for example, for s- or p-polarized light, FIG. 6 the ray path for green light in the process according to the invention, in a representation according to FIG. 2, FIG. 7 in a representation analogous to FIG. 6 the ray path realized according to the invention for blue light, FIG. 8 in analogy to the representations according to FIGS. 6 and 7 the ray path realized according to the invention for red light, FIG. 9 a further embodiment of a configuration according to the invention, in plate embodiment in part, FIG. 10 a further embodiment of the configuration according to the invention which differs from beam deflections of 45° or 90° angles, and FIG. 11 in a representation analogous to FIG. 10 the same embodiment with respect to difference from angles of 45°, in plate embodiment in part.

The fundamental structure and function of the configuration according to the invention or the process according to the invention will be explained with reference to FIG. 1.

White light $L_W$ is directed with spectrally selective polarization, for example for red light (R) of polarization $P_0$, for blue light (B), $P_0$, and, in this respect rotated by 90°, for example for green light (G), $P_{90}$, onto a polarization-selective splitter configuration 1. The spectrally selective polarization in $P_0$, for example for red, $\Delta\lambda_2$, and blue, $\Delta\lambda_1$, or $P_{90}$ for green light, $\Delta\lambda_3$, is obtained through an additional preceding optical element, not shown in FIG. 1, for example through a film laminate such as is described in U.S. Pat. No. 5,751,384. In this respect this document is declared to be an integrated component of the present specification as an example of the realization of spectrally selective polarization.

On the polarization-selective splitter configuration 1 light of polarization $P_{90}$ is transmitted into a first direction I, light of polarization $P_0$ is reflected into a second direction II.

Succeeding the polarization-selective splitter configuration 1 in the first direction I is a light valve 3a operating in reflection.

Succeeding the polarization-selective splitter configuration in the second direction II a spectrally selective splitter configuration 5 is provided. The latter splits the light incident in the second direction II of the two spectra $\Delta\lambda_1$, $\Delta\lambda_2$ still polarized with $P_0$, into a third III and fourth IV direction, but now represented spectrally selectively with $\Delta\lambda_1$, $\Delta\lambda_2$.

Under the broadest aspect of the present invention, the third—III—and fourth—IV—directions, not needing to be parallel, correspond to the second II and first directions I. It is not mandatory that a configuration based on 45° of the selective splitter configurations 1, 5 is realized.

Succeeding the spectrally selective splitter configuration 5 in the third III and fourth IV directions is provided one light valve 3b or 3c each, operating in reflection.

The light $L_W$, now divided polarization-selectively as well as also spectrally selectively, is reflected on said light valves 3 operating in reflection.

The course of the reflected light is represented in FIG. 1 with solid arrow tips or arrows, alternatively.

From the two light valves 3b and 3c succeeding the spectrally selective splitter configuration 5 the light in the configuration according to the FIG. 1 is correspondingly reflected in the third III and fourth IV directions. However, dependent on the operating state of said light valves or their pixels, this takes place still with polarization $P_0$—dark state—or rotated to polarization $P_{90}$—bright state.

Consequently, from the second direction impinges onto the polarization-selective splitter configuration 1 light of the two spectral ranges $\Delta\lambda_1$, and $\Delta\lambda_2$ after recombination on the spectrally selective splitter configuration 5, but, depending on the operating state of said light valve pixels, with the polarization $P_0$ or $P_{90}$ independently of the spectrum.

Analogously, the light incident on light valve 3a of the spectral range $\Delta\lambda_3$, depending on the operating state of its pixels still in polarization $P_{90}$ or with polarization $P_0$, is reflected in the first direction I and is incident on the polarization-selective splitter configuration 1. The light of the three spectra $\Delta\lambda_1$, $\Delta\lambda_2$, $\Delta\lambda_3$ is polarization-selectively recombined on the polarization-selective splitter configuration 1:

Light of the spectral range $\Delta\lambda_3$, in the bright state of the pixels of light valve 3a rotated to polarization $P_0$, due to the effect of the polarization-selective splitter configuration 1, in analogy to its effect on incident light, emerges in the second direction II.

Light of the two spectral ranges $\Delta\lambda_1$ and $\Delta\lambda_2$ impinges from the second direction onto the polarization-selective splitter configuration 1, in the bright state of the corresponding pixels rotated into polarization $P_{90}$ on light valves 3b and 3c, and propagated in the second direction II: an imaging beam A is formed in said second direction II with light of the three spectra modulated through the associated light valve pixels in the bright state H.

Light of spectral range $\Delta\lambda_3$ in the first direction I, thus reflected from light valve 3a, in the dark operation state of the associated pixels, is incident with unchanged polarization $P_{90}$ on the polarization-selective splitter configuration 1 and emerges in the first direction I.

Light from the second direction II with polarization $P_{90}$, such as is generated through the dark state of the associated pixels on light valves 3b and 3c, also emerges in the first direction I from the polarization-selective configuration I: a second beam B with light of the three spectra is formed, reflected on the light valves with the driving of the associated pixels into the dark state D.

According to FIG. 1 the configurations 1 and 5, with respect to the light entry and the spectral exits at the light valves, when viewed as a black box, form a spectrally selective division and recombination unit.

Figure 2:
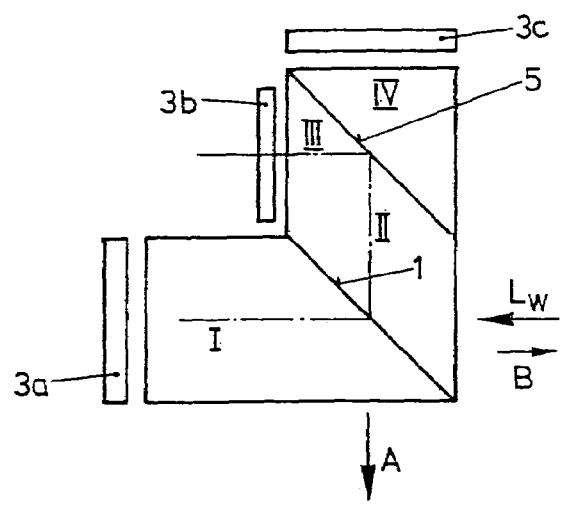

In FIG. 2 is shown the fundamental structure of the configuration operating according to FIG. 1, and here also, as preferred, pairwise parallelism of the four directions I–IV is realized. The structural parts already explained in conjunction with FIG. 1 carry the same reference symbols in FIG. 2.

Figure 3:
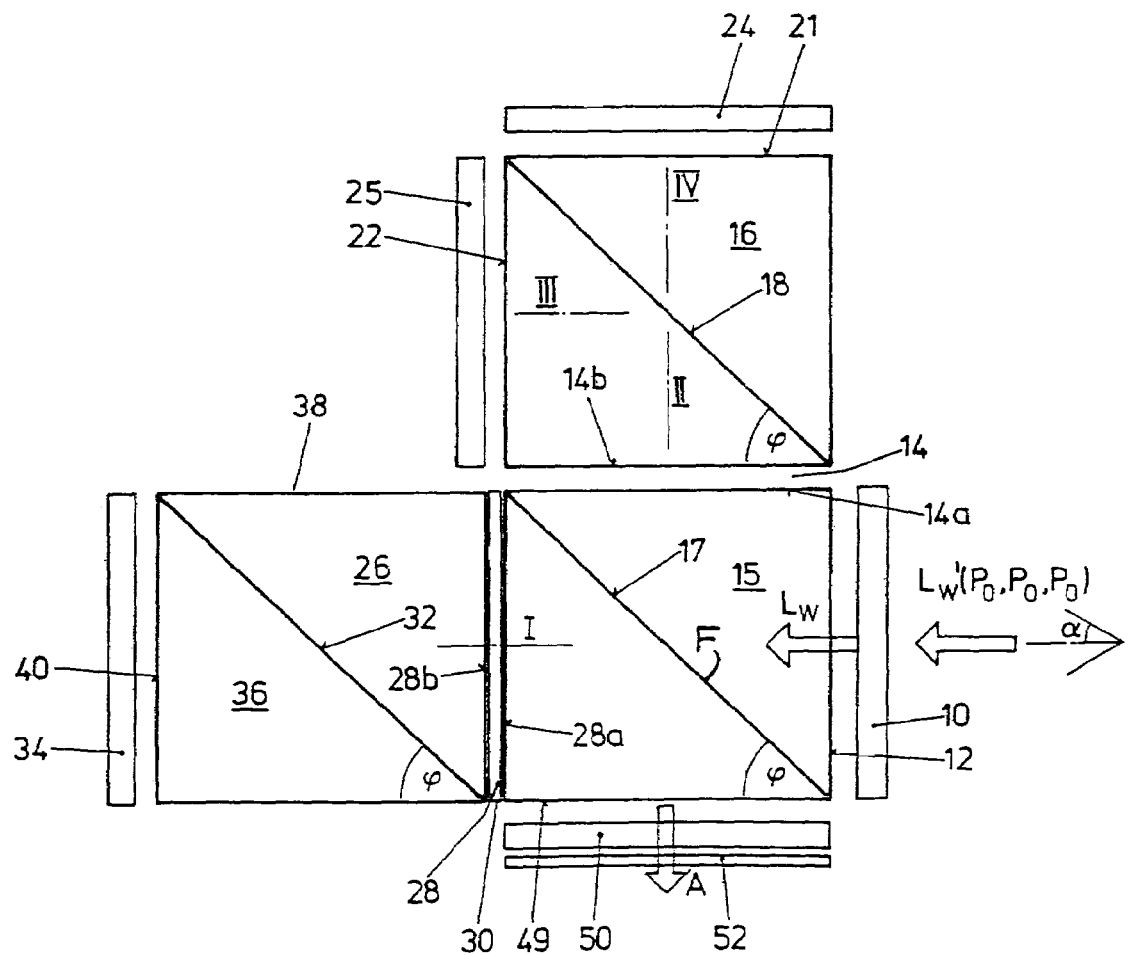

In FIG. 3 a preferred embodiment of a light division and recombination configuration operating after the process according to the invention is depicted together with the light valves preferably combined with the configuration as well as of parts such as are preferably provided in realizing a projection arrangement according to the invention.

The incident white light $L'_W$ is polarized under $P_0$. The generation of such light by means of polarizers and/or polarization conversion systems is generally known.

A spectrally selective polarization rotator 10 now has the task of rotating the polarization of a spectral range of the visible light $L_W$ relative to the other two by 90°, $P_{90}$. The rotator can comprise, for example, a laminate of birefringent films, such as, as stated, is described in U.S. Pat. No. 5,751,384. Therewith the white light $L_W$, according to FIG. 1, is available.

$L_W$ is incident on the entry face 12 of the configuration according to the invention, preferably substantially perpendicularly, as shown. Depending on whether or not the polarization rotator 10 is disposed directly on face 12, it requires a corresponding refractive index matching layer system or an antireflection layer system (not shown) on rotator 10 and/or on face 12.

The light $L_W$ passes through the substrate material of the polarization-selective splitter configuration 15 which, according to FIG. 3, is preferably square in cross section. As the substrate material, preferably for both sub-bodies bilaterally of a diagonal face F, identical material, preferably glass, is used. The refractive index of the substrate material on both sides of face F should as much as possible be identical. The optical properties of the substrate material are also one of the determinants of the spectral characteristic of the polarization-selective splitter configuration 15. Essential is further that the material absorbs little light, in particular in the blue spectral range $\Delta\lambda_B$. The optical design of the polarization-selective layer system 17 is simple in face F if the refractive index of the substrate material is high. Therefore SF2 material is, for example, suitable which has an index of refraction of n=1.65. To be taken into consideration are also the birefringent properties of the substrate material.

Light $L_W$ of the one polarization $P_0$ which, with respect to the splitter configuration 15, is also denoted as s-polarization, should, as much as possible, be reflected completely on layer system 17, while light of the other polarization $P_{90}$, which, with respect to the splitter configuration 15, is also denoted as p-polarization, should, as much as possible, be transmitted completely. A wide angle acceptance is, furthermore, essential if the configuration according to the invention, as preferred, also be used for divergent white light illumination arrangements. These have typically an angle of aperture of $\alpha=\pm12°$ or more. If, for example, a known MacNeille polarizer is used (see, for example, H. A. MacLeod "Thin Film Optical Filters", Second Edition, pp. 328–332, Adam Hilger, 1986), the angle dependence for reflection in s-polarization does not present a problem while the p-transmission has a strong angle dependence. With an illumination aperture angle $\alpha$ of the above order of magnitude typically a loss of approximately 15% in this transmission results.

Of $L_W$ the spectral range $\Delta\lambda_R$ and $\Delta\lambda_B$ in s-polarization is incident on layer system 17 and completely reflected on it in the second direction II. The third spectral range $\Delta\lambda_G$ in p-polarization is transmitted in the first direction I. Thus, as already explained, through the combination of the spectrally selective polarization rotator 10 as well as of the polarization-selective splitter 15 a spectral range ion takes place on the basis of the polarization criterion. It should be noted that the polarization rotator 10 has substantially no angle dependence and that the polarization-selective splitter 15 can be optimized such that it hardly has any wavelength dependence. It is therewith attained that the system has substantially no undesirable coloration effects which can be traced to angle dependencies.

Light of spectral ranges $\Delta\lambda_B$ and $\Delta\lambda_R$ propagating in direction II enters a spectrally selective splitter 16. If the configuration according to the invention is to be structured modularly, then the rectangular parallelepipeds of configurations 15 and 16 are each e parts and, in any case, an interfacial surface 14 results. It is therefore entirely possible to realize the configurations 15, 16 integrally without an interfacial surface 14. If on the interfacial surface 14 an air gap is provided, it is of advantage to provide on the one and/or on the other of faces 14a, 14b an antireflection coating.

In the case of direct contacting of the configurations 15, 16 free of air gap, an intermediate layer can be of advantage for the matching of the refractive indices of the two materials on the one and/or the other face 14a, 14b.

The dichroic or spectrally selective layer system 18 of the spectrally selective splitter configuration 16 is, as shown, again laid out preferably with a 45° prism geometry. Since here a splitter system is necessary which, as much as possible, is independent of polarization, a substrate material is preferably used which has a low index of refraction. Therewith the substrate material of the splitter configurations 16 and 15 is preferably selected to be different and the previously mentioned antireflection and index matching measures on the interfacial surface 14 must be taken. For splitter 16 preferably as the substrate material BK7 is used which has a refractive index n=1.52 and, again, attention should be paid to a low mechanical birefringence.

It is not absolutely required but preferred that the same substrate material is used on both sides of layer system 18. With respect to the dichroic color splitter layer system 18 it is essential that the transmission and reflection characteristics for the remaining two spectral ranges $\Delta\lambda_B$ and $\Delta\lambda_R$ are substantially independent of polarization. Since for the green spectral range $\Delta\lambda_G$ the realization of polarization independence and angle independence is far more critical than for the blue range $\Delta\lambda_B$ and the red range $\Delta\lambda_R$, it is evident why the last mentioned spectral ranges are preferably supplied to the spectrally selective splitter configuration 16.

Figure 4:
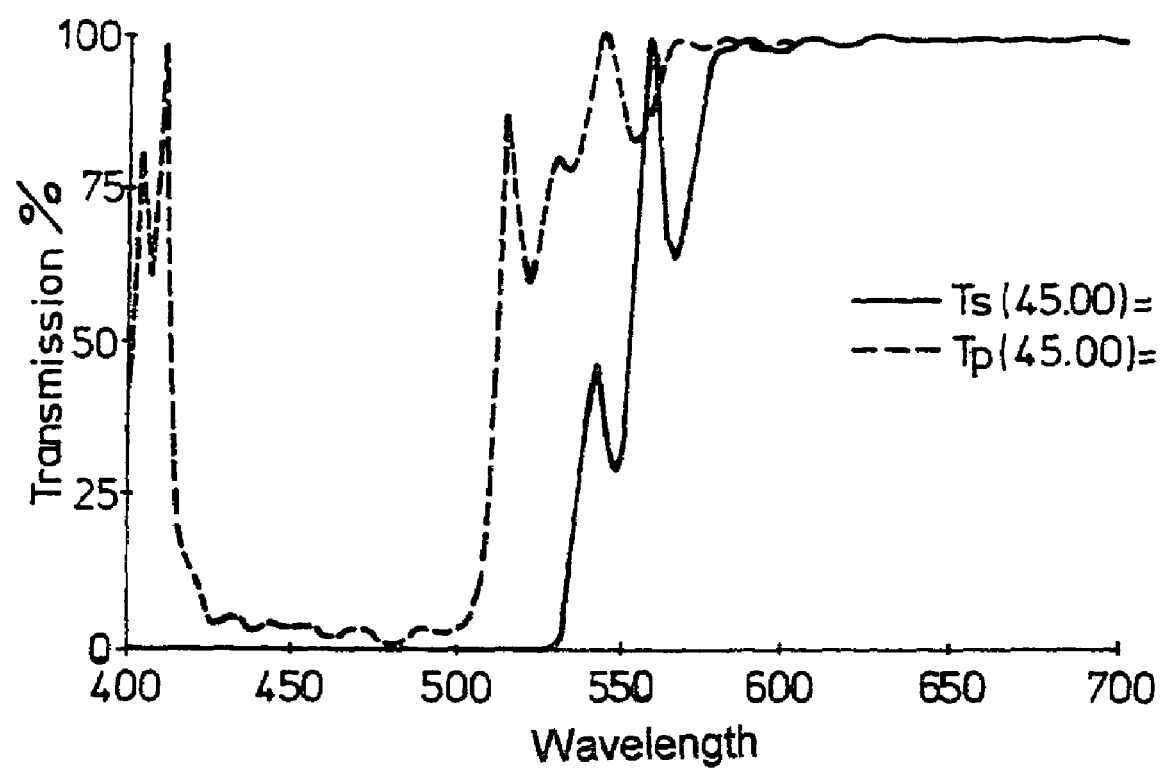

FIG. 4 shows the transmission behavior of a dichroic layer system 18, used by example, in BK7 substrate material for angles of incidence of 45° for the s-polarization as well as also for the p-polarization.

The spectrally selective layer system 18 was produced according to the characteristic to be brought into effect as long pass filter, as optical multilayer system 67 layers, alternately of high and low-refracting materials ($TiO_2$, $Y_2O_3$). Other materials and layer sequences suitable for this filter type are possible in known manner.

Figure 5:
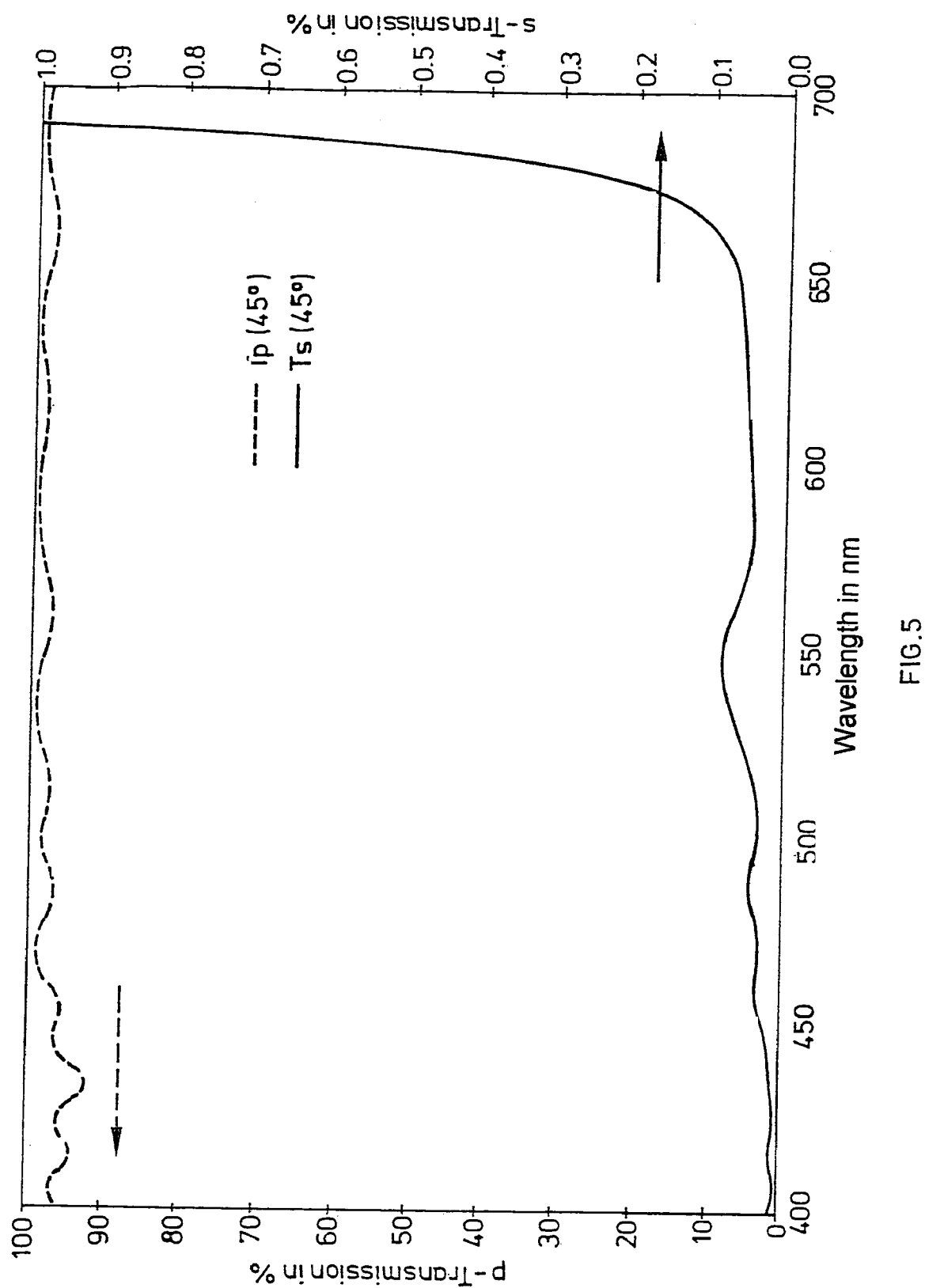

In FIG. 5 is shown the transmission behavior of a polarization-selective layer system 17 for p- and s-polarized white light. The layer system was implemented as a typical MacNeille polarizer comprising 45 optical alternating layers of $SiO_2/Ta_2O_5$. It is understood that here other layer sequences and/or materials are also possible.

The emergent faces 20 or 22 of the spectrally selective splitter configuration 16 for the corresponding spectral ranges $\Delta\lambda_R$ and $\Delta\lambda_B$ can, if appropriate, be provided with an antireflection coating. If onto these faces further optical elements are directly cemented, such as light valves 25 and 24, layer systems are preferably installed for refraction index matching.

Considering retrospectively the effect of the polarization-selective splitter configuration 15, light in p-polarization propagates in direction I. Preferably in addition to the explanations according to FIGS. 1 and 2, according to FIG. 3 a compensation body 26 is preferably provided. If the configuration depicted in FIG. 3 is modularly constructed with parts 15, 16 and 26, an interfacial surface 28 between splitter 15 and compensation body 26 results. This occurs in particular if the materials of the substrate of splitter 15 differ from the material of body 26. If in the interfacial surface region 28 an air gap is provided, it is of advantage to provide on the one and/or the other of these surfaces 28a and/or 28b an antireflection layer system. If the transition is realized free of air gap, it can be advantageous to carry out a matching of the refractive index depending on the selection of the substrate materials bordering on each other.

The compensation body 26 is especially preferably provided in order to carry out a color trimming as well, yet be described. For this purpose, further advantageously a so-called halfwave retarder plate 30 is installed between surfaces 28a and 28b with which the polarization of the light in the spectral range $\Delta\lambda_G$ can be rotated.

If such a halfwave retarder plate 30 is used with or without air gaps, it is preferred to provide again a refractive index matching layer system or an antireflection system on the interfacial surfaces 28a and/or 28b and/or the corresponding surfaces of the retarder plate 30.

Apart from the possibility to provide a color trimming on the compensation body 26, with it the optical path of the light $\Delta\lambda_G$ propagated therein is adapted to that of the light of the two other spectral ranges $\Delta\lambda_B$ and $\Delta\lambda_R$. On both sides of the layer system 32, yet to be described, preferably in the 45° diagonal face of body 26, the substrate material is preferably identical and, further preferred, identical to that of the splitter configuration 15.

The color trimming layer system 32 preferably provided in the 45° diagonal face of the compensation body 26 reflects selectively spectral ranges of the light away from the optical path, direction I. Therewith the compensation body 28 is also a spectrally selective splitter configuration. If no half-wave retarder plate 30 is provided, the light $\Delta\lambda_G$ is first incident in p-polarization on system 32, and is typically transmitted. If the light $\Delta\lambda_G$, in the bright state of succeeding light valve pixels, returns in s-polarization, the layer system 32 can function very well as trimming filter; it affects the spectral characteristic in the bright state while the latter in the dark state of the pixels is substantially not affected; the light $\Delta\lambda_G$ remains in this case p-polarized. The light reflected away by system 32 of given spurious spectral ranges, for example, emerges through a face 36 from the system or the compensation body.

One possibility of trimming the behavior of the system also for the dark state of the pixels is given in the combined use of layer system 32 and retarder plate 30. If by means of the retarder plate 30 the initially p-polarized light is rotated into s-polarization by the polarization-selective splitter configuration 15, a color trimming can already take place on the path to the light valve 34. The light subsequently reflected away on layer system 32 leaves the system at the emergent face 38. Since in the dark state of the pixels no polarization change of the reflected light $\Delta\lambda_G$ occurs, reflected light on its return path again after s-polarization, is incident for a second time on layer system 32, and is trimmed for a second time thereby that undesirable spectral components were reflected away via face 36. This results in an improvement in the dark state and thus an improvement of the realized image contrast.

As already described for other interfacial surfaces, at the emergent face 40, depending on whether or not an air gap to the succeeding light valve 34 is provided, as well as the materials abutting it, an antireflection coating and/or a layer system is preferably installed for the matching of the refractive indices. This applies also to the emergent faces 38 as well as 36 as a function of the structure of a total system in practice.

A further improvement of the transmission properties can be provided, if appropriate, by provision of a further spectrally selective polarization rotator 50 in combination with an analyzer 52.

Via the emergent face 49 implemented with or without air gap and correspondingly preferred with antireflection and/or refractive index matching layer systems, the imaging beam A according to FIG. 2 emerges. If, potentially, light emerges in the imaging beam A from pixels switched in the dark state, its fraction can be minimized with said spectrally selective polarization rotator 50 and the succeeding analyzer 52.

Light of spectral range $\Delta\lambda_R$ and $\Delta\lambda_B$, which is combined correspondingly from the light valves 24 or 25 in the pixel bright state to form the imaging beam A, is p-polarized with respect to the polarization-selective layer system 17. In contrast, light $\Delta\lambda_G$ reflected by light valve 34 in the pixel bright state and is recombined to form imaging beam A, is there s-polarized. On the polarization-selective layer system 17, or generally on the polarization-selective splitter configuration 15, a portion, typically approximately 10%, of the light incident in the dark state of the pixels is also reflected into the imaging beam A. With the aid of the spectrally selective polarization rotator element 50, this fraction can be repolarized into s-polarized light which subsequently makes all components of the light reflected in the pixel bright state p-polarized by placing the effective spectrum of this rotator into the spectral range $\Delta\lambda_G$. All components of the light, reflected erroneously in the pixel dark state, in the imaging beam A are subsequently s-polarized. It is subsequently simple to block out with the aid of the analyzer 52 the component in the total spectrum brought about by the dark state.

The analyzer 52 can therein comprise a polarization film.

Subsequently, in summary again the ray path of the discrete spectral ranges will be described. For reasons of clarity and conformance with the preferred embodiment, according to FIG. 1, $\Delta\lambda_1$ will be referred to as blue light B, $\Delta\lambda_2$ as red light R, and $\Delta\lambda_3$ as green light G.

The description follows the representation according to FIG. 2.

Figure 6:
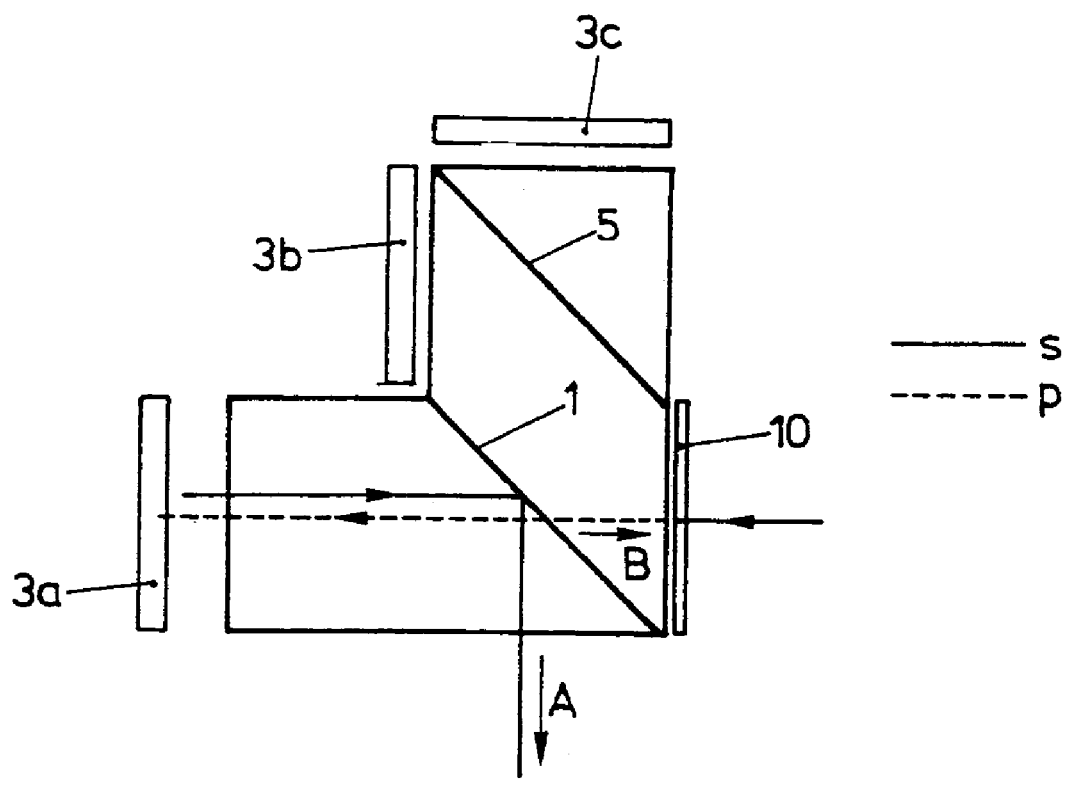
Figure 7:
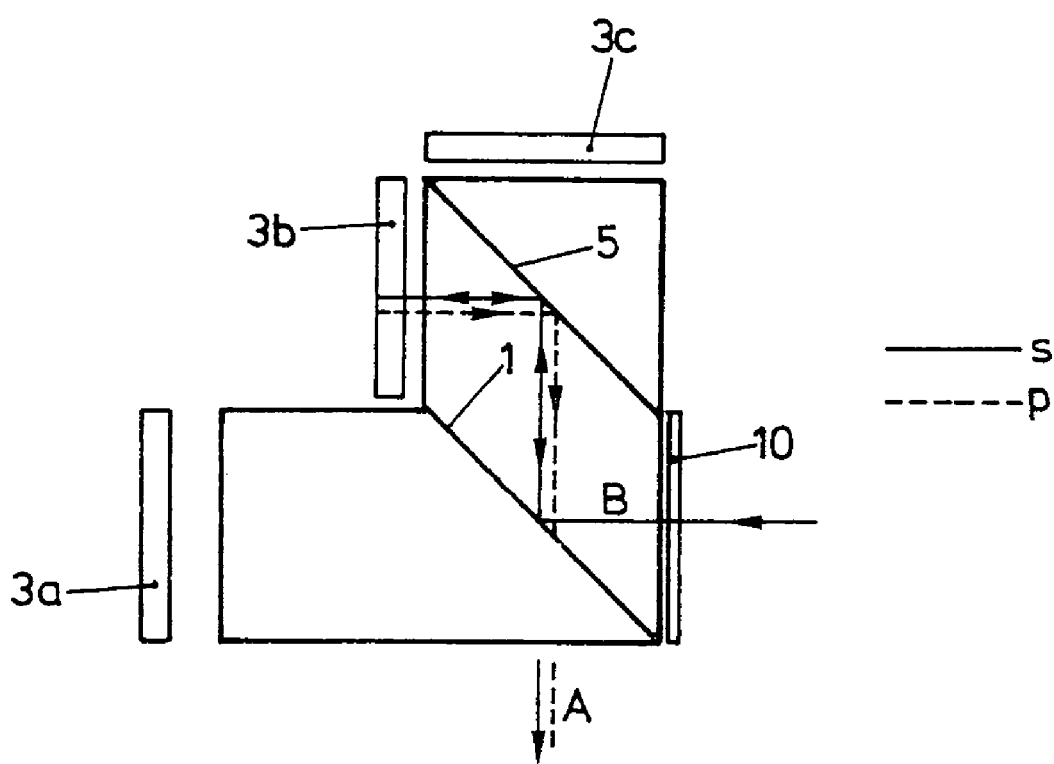
Figure 8:
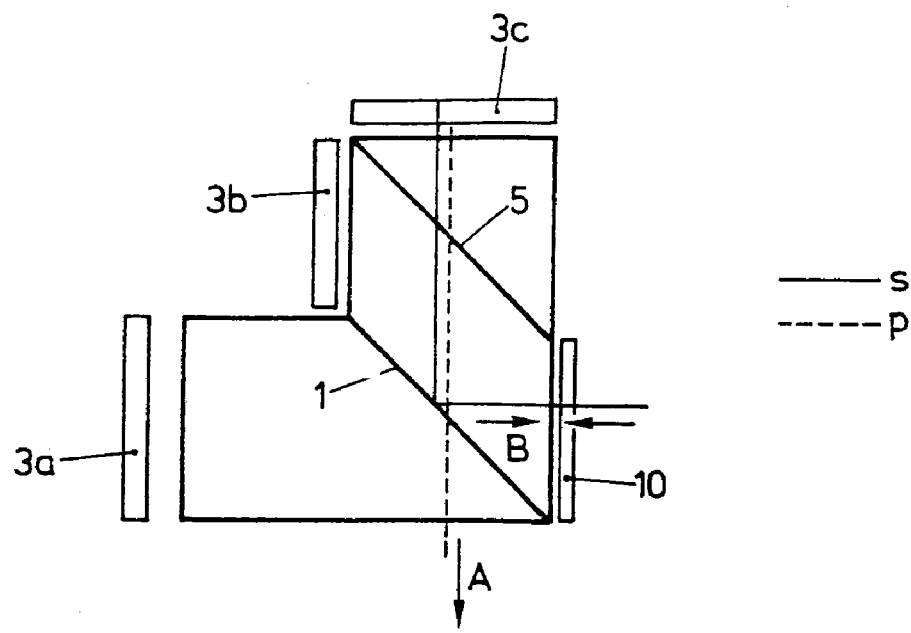

Ray Path G:

White light, s-polarized with respect to the polarization-selective splitter configuration 1, is incident on green rotator 10. S-polarization is depicted in FIG. 6 as well as also the following Figures with a ray path drawn in solid lines.

G leaves the rotator 10 in p-polarized form (dashed lines). Consequently, G is transmitted on the polarization-selective splitter 1 and is incident on the light valve configuration 3a.

In the bright state of its pixels, the polarization of the reflected G is rotated into s-polarization. On the polarization-selective configuration 1 the s-polarized G is output in the direction of the imaging optics system, i.e. as spectral part of the imaging beam A. In the dark state of the pixels, the polarization of the reflected light G with respect to that of the incident light is not changed. Consequently, G is reflected in p-polarization and is incident on the polarization-selective splitter configuration 1, where it is transmitted as a portion of beam B back to the illumination optics system.

Ray Path B:

B is not changed on the spectrally selective rotator 10 with respect to its polarization and thus is incident s-polarized on the polarization-selective splitter configuration 1. According to its polarization, B is reflected there and is incident, still s-polarized, on the spectrally selective splitter configuration 5 where it is reflected according to its spectral range and, still s-polarized, is incident on the light valve configuration 3b.

In the bright state of the pixels a polarization rotation takes place, B is p-polarized and reflected back onto the spectrally selective splitter configuration 5 where it is reflected according to its spectral range. B, still p-polarized, is incident on the polarization-selective splitter configuration 1 where it is transmitted as spectral range B of the imaging beam A in the direction to the imaging optics system.

In the dark state of the pixels no polarization rotation takes place, B is still s-polarized and reflected back onto the spectrally selective splitter configuration 5 where it is reflected according to its spectral range. B, still s-polarized, is incident on the polarization-selective splitter configuration 1 where it is reflected as spectral component B of beam B in the direction toward the illumination optics system.

Ray Path R:

R is changed on the spectrally selective rotator 10 with respect to its polarization and thus is incident s-polarized on the polarization-selective splitter configuration 1. According to its polarization, R is reflected there and is incident, still s-polarized, on the spectrally selective splitter configuration 5 where it is transmitted according to its spectral range and, still s-polarized, is incident on the light valve configuration 3c.

In the bright state of the pixels a polarization rotation takes place, R is reflected back in p-polarization onto the spectrally selective splitter configuration 5 where, according to its spectral range, it is transmitted. R, still p-polarized, is incident on the polarization-selective splitter configuration 1 where it is transmitted as spectral component R of the imaging beam A in the direction of the imaging optics system.

In the dark state of the pixels no polarization rotation takes place. R is, still s-polarized, reflected back onto the spectrally selective splitter configuration 5 where it is transmitted according to its spectral range. R, still s-polarized, is incident on the polarization-selective splitter configuration 1 where it is reflected as spectral range R of beam B in the direction toward the illumination optics system.

The depicted embodiment is customarily referred to as green or $\Delta\lambda_3$ stand-alone version since the ray path of this spectrum is relatively early ed and thus isolated. It is understood that it is also possible to realize a red or $\Delta\lambda_2$ stand-alone version or a blue or $\Delta\lambda_1$ stand-alone version.

Furthermore, with respect to the light incident from the illumination source on the polarization-selective splitter configuration 1 the following two variants are possible:
   one spectral range p-polarized, two s-polarized, as described, or
   one spectral range s-polarized, two p-polarized.

Furthermore, the following variants are possible:
   green stand-alone, transmitted red on the spectrally selective splitter, reflected blue, as described
   green stand-alone transmitted blue and reflected red on the spectrally selective splitter,
   red stand-alone, transmitted green and reflected blue on the spectrally selective splitter,
   red stand-alone, transmitted blue and reflected green on the spectrally selective splitter,
   blue stand-alone, transmitted red and reflected green on the spectrally selective splitter,
   blue stand-alone, transmitted green and reflected red on the spectrally selective splitter.

In the following still further embodiments of the configuration according to the invention or the process according to the invention will be described.

Figure 9:
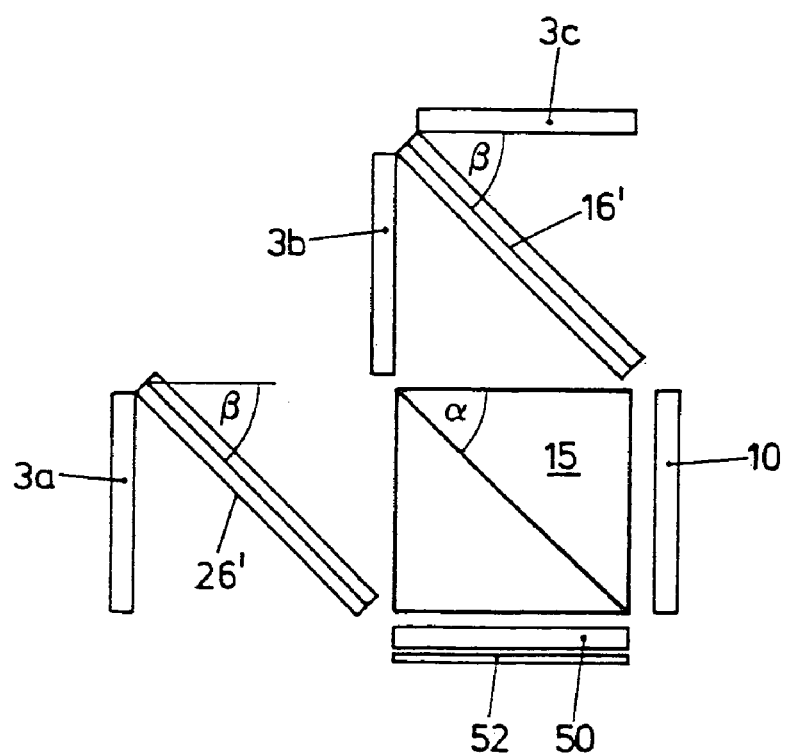

According to FIG. 9, in which the same reference symbols are used for the same elements as are explained in conjunction with FIG. 3, the spectrally selective splitter configuration 16' is implemented as a glass plate as well as the compensation body 26'.

The embodiment, for example according to FIG. 3, but also according to, for example, FIG. 2, with solid bodies has primarily the advantage that light-incident faces can be simply realized in substrate materials perpendicularly to the direction of light incidence and thus few problems involving ray offset and astigmatism occur. But it must be noted that the design of the spectrally selective splitter layer system in solids is more difficult since the difference in the polarization is greater than on the plate version depicted in FIG. 9. Furthermore, in the solid version the light must travel a relatively long way in the substrate material which results in a stronger effect of the occurring mechanical birefringence.

In the case of the plate structure according to FIG. 9, it needs to be considered that the optical path length for the three spectral components of the light must be identical. That means the layer system functioning spectrally selectively on the configuration 16' must be packed in the manner of a sandwich between two glass substrates and in the "stand-alone" path an analogous geometric configuration should adapt the length of the optical path.

Figure 10:
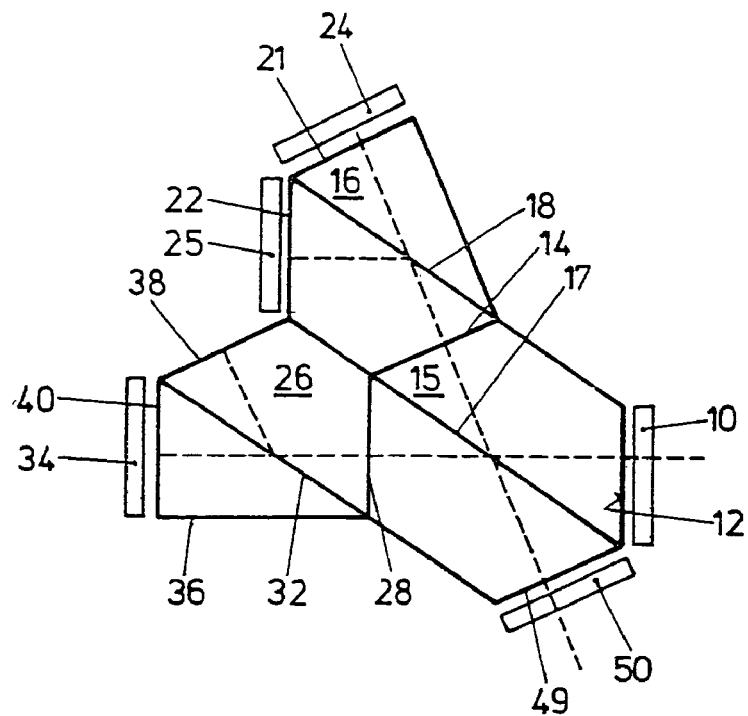

FIG. 10 shows an embodiment in which a polarization-selective splitter configuration 15 is used with angles deviating from 45°. It is known to a person skilled in the art that polarizing splitter configurations, depending on the type used, have optimum efficiency at differing angles of incidence. Examples are the already mentioned MacNeille polarizer; polarizing beam splitters which operate above the critical angle (see for example Li Li et al. "High Efficiency LCD Projection Displays with Novel Thin-Film Polarizing Beam Splitters", SID 98 Digest, pp. 686–689, 1998); polarizing beam splitters based on liquid crystals (see for example K. Vinokur et al., "High-Contrast-Ratio Broad-Angle LC Polarizing Beam Splitter", SID 98, Digest, pp. 690–693, 1998).

Figure 11:
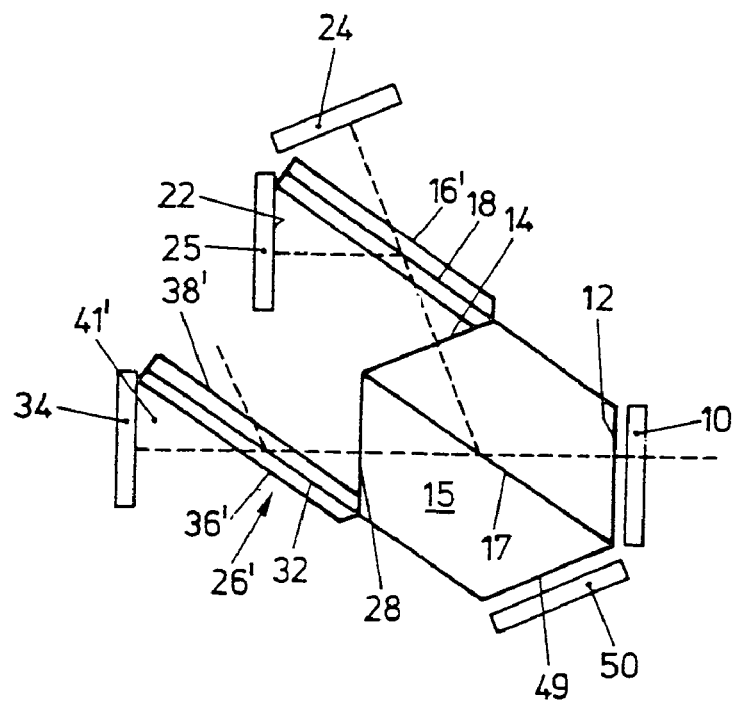

In FIG. 11 is shown the configuration according to the invention conformably with FIG. 10 in "Plate Construction." Relatively expensive measures against the introduced astigmatism become necessary. Concomitant with losses in contrast, furthermore fundamentally the reflection angles on the polarization-selective splitter configuration as well as the spectrally selective omitted can be different and has no absolute need to be 45°.

The process according to the invention can be realized with respect to material and production by using relatively simple structural parts, in particular if the (not absolutely necessary) basis is 45°.

The spectrally selective polarization rotators 10 used preferably within the scope of the present invention comprise a very low angle dependence. Since the splitting-off of the first spectral range (in particular, as has been explained in detail, of the green range) takes place in combination with a largely wavelength-neutral structural element, namely the polarization-selective beam splitter 17 to be provided, an extremely low angle dependence in the spectral characteristic can be expected. Thereby small F numbers, i.e. large angular ranges become possible without disturbing color effects on the margin and in corner zones of the optically effective structural elements.

In particular in the preferred green stand-alone version, the spectrally selectively dividing layer system can be selected such that polarization shift and angle shift show an effect largely only in the green spectral range. Consequently, on the one hand, the transmission of blue and red light becomes noncritical and, no disturbing color effects nor losses occur there, on the other hand, the stand-alone channel, as has been explained, can be trimmed relatively simply.

In the preferred embodiment, furthermore, the light is only incident on layer systems disposed in parallel with respect to one another. This has the advantage that the "compound angle depolarization", mentioned in the introduction and described in Rosenbluth, can be kept extremely low without further expensive measures. Therefore a special phase optimization of the thin-film layer systems does not need to be carried out in order to attain optimally good contrast.

Furthermore, the optical path, which the light travels after reflection on the light valves in the substrate material, can be kept relatively short which minimizes problems based on depolarization through mechanical birefringence. In the preferred 45°-based embodiment light produced by residual reflection and, if it reaches the imaging beam A, negatively influencing the contrast, is subsequently substantially incident perpendicularly on the emergent faces of the configuration, which makes it simpler to eliminate it through suitable measures (for example black surfaces which can absorb light) than in configurations with angles not equal to 45°.

What is claimed is:

1. A spectral light division and recombination configuration with:

an incident face for light to be divided;

at least one emergent face (49) for recombined light (A, B);

a spectrally selective light division system comprising a polarization-selective division system and selectively separating light of a first spectral range from light of a second and of a third spectral range left combined;

a recombining system recombining light of said first spectral range with light of said second and third spectral ranges;

wherein said first spectral range comprises green light and is spectrally located between said second and said third spectral ranges.

2. The configuration of claim 1, wherein said green spectral range includes wavelengths in the range of 490 nm to 605 nm.

3. The configuration of claim 1, wherein said second and third spectral ranges include light from blue and red spectral ranges respectively.

4. The configuration of claim 3, wherein said blue spectral range includes wavelengths in the range of 380 nm to 510 nm and said red spectral ranges includes wavelengths in the range of 580 nm to 780 nm.

5. The configuration of claim 1, wherein said incident face is succeeded first by said polarization-selective division system and subsequently by at least one spectrally selective division system along an optical path of the configuration.

6. The configuration of claim 1, wherein said polarization-selective division system is preceded by a spectrally selective polarization rotator along the optical path of the configuration.

7. The configuration of claim 6, wherein said spectrally selective polarization rotator is preceded by a broadband polarizer along the optical path of the configuration.

8. The configuration of claim 1, wherein succeeding said polarization-selective division system along an optical path of the configuration, is a color trimmer.

9. The configuration of claim 1, wherein in a direction of reflection succeeding the polarization-selective division system there is provided a spectrally selective division system.

10. The configuration of claim 1, wherein in a direction of reflection, said polarization-selective division system is succeeded by a spectrally selective division system and/or said polarization-selective division system in a direction of transmission (I) is succeeded by a further spectrally selective splitter, the polarization-selective division system comprising a first planar layer system, the spectrally selective division system and/or the further beam splitter comprising a second planar layer system, planes of said first and second layer systems being parallel with respect to one another.

11. The configuration of claim 1, wherein said emergent face for recombined light is said incident face.

12. The configuration of claim 1, wherein said recombining system includes said spectrally selective light division system.

13. The configuration of claim 1, wherein a first emergent face for recombined light of primarily one polarization as well as a second emergent face is provided for recombined light of different polarization and wherein said light of said one polarization is said light of said first spectral range.

14. The configuration of claim 13, wherein one of said first and second emergent faces is said incident face.

15. The configuration of claim 1, further comprising at least one controlled light valve configuration operating in reflection and downstream of said spectrally selective division system.

16. The configuration of claim 1, further comprising a first controlled light valve configuration operating in reflection in a path of said light of said first spectral range downstream of said spectrally selective light division system, a second controlled light valve configuration operating in reflection in a propagation path of light of said first spectral range downstream of said spectrally selective division system and a third controlled light valve configuration operating in reflection in a propagation path of light of said third spectral range downstream of said spectrally selective division system.

17. The configuration of claim 1, further comprising a white light illumination source preceding said incident face along an optical path of the configuration.

18. The configuration of claim 1, further comprising an imaging optics succeeding said spectrally selective division system along an optical path of the configuration.

19. The configuration of claim 1, further comprising at least one of a spectrally selective polarization rotator and of a polarization-selective filter element downstream of said polarization-selective division system.

20. The configuration of claim 1, wherein said polarization-selective division system has a substantially polygonal cross-section and has a polarization-selective layer system at least approximately in a diagonal of said cross-section.

21. The configuration of claim 20, wherein said cross-section is one of rectangular and square.

22. A spectral light division and recombination configuration with:

an incident face for light to be divided;

at least one emergent face (49) for recombined light (A, B) being said incident face;

a spectrally selective light division system selectively separating light of a first spectral range from light of a second and of a third spectral range left combined;

a recombining system recombining light of said first spectral range with light of said second and third spectral ranges;

wherein said first spectral range comprises green light and is spectrally located between said second and said third spectral ranges.

23. A spectral light division and recombination configuration with:

an incident face for light to be divided;

at least one emergent face (49) for recombined light (A, B);

a spectrally selective light division system selectively separating light of a first spectral range from light of a second and of a third spectral range left combined;

a recombining system including said spectrally selective light division system for recombining light of said first spectral range with light of said second and third spectral ranges;

wherein said first spectral range comprises green light and is spectrally located between said second and said third spectral ranges.

24. A spectral light division and recombination configuration with:

an incident face for light to be divided;

at least one emergent face (49) for recombined light (A, B);

a spectrally selective light division system selectively separating light of a first spectral range from light of a second and of a third spectral range left combined;

a recombining system recombining light of said first spectral range with light of said second and third spectral ranges; and at least one controlled light valve configuration operating in reflection and downstream of spectrally selective division system;

wherein said first spectral range comprises green light and is spectrally located between said second and said third spectral ranges.

25. A spectral light division and recombination configuration with:
   an incident face for light to be divided;
   at least one emergent face (49) for recombined light (A, B);
   a spectrally selective light division system selectively separating light of a first spectral range from light of a second and of a third spectral range left combined;
   a recombining system recombining light of said first spectral range with light of said second and third spectral ranges; and
   a first controlled light valve configuration operating in reflection in a path of said light of said first spectral range downstream of said spectrally selective division system, a second controlled light valve configuration operating in reflection in a propagation path of light of said first spectral range downstream of said spectrally selective division system and a third controlled light valve configuration operating in reflection in a propagation path of light of said third spectral range downstream of said spectrally selective division system;
   wherein said first spectral range comprises green light and is spectrally located between said second and said third spectral ranges.

26. A method for producing an optical image comprising the steps of:
   first polarization-selectively dividing impinging light into light in a first spectral range which comprises light of the green spectral range and other light;
   dividing said other light resulting from said first dividing into light of a second spectral range and light of a third spectral range; and
   selectively modulating said light of said first, second and third spectral ranges by controlled light valves.

27. The method of claim 26, further comprising selecting as said light in said second spectral range light comprising light in the red spectral range and as light in said third spectral range light comprising light in the blue spectral range.

28. The method of claim 26, wherein said green spectral range comprised wavelengths in the range of 490 nm to 605 nm.

29. The method of claim 28, wherein said light in said second spectral range comprised light with wavelengths in the range of 580 nm to 780 nm, and said light in said third spectral range comprises light with wavelengths in the range of 380 nm to 510 nm.

30. The method of claim 26, wherein said other light comprises light spectrally above as well as spectrally below said first spectral range.

31. The method of claim 26, wherein said dividing of said other light is performed spectrally selectively.

32. The method of claim 26, wherein said modulating is performed by controlled light valves operating in reflection.

33. The method of claim 32, further comprising rotating polarization of light by means of said controlled light valves and in dependancy of their activation status.

34. A method for producing an optical image comprising the steps of:
   first dividing impinging light into light in a first spectral range which comprises light of the green spectral range and other light;
   dividing said other light resulting from said first dividing into light of a second spectral range and light of a third spectral range; and
   selectively modulating said light of said first, second and third spectral ranges by controlled light valves, wherein said modulating is performed by controlled light valves and in dependancy of their activation status.

* * * * *